(12) United States Patent
Kato (10) Patent No.: US 7,124,209 B2
(45) Date of Patent: Oct. 17, 2006

(54) PERIPHERAL EQUIPMENT OF COMPUTER

(75) Inventor: Hiroyuki Kato, Ichikawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 685 days.

(21) Appl. No.: 10/189,005

(22) Filed: Jul. 5, 2002

(65) Prior Publication Data

US 2004/0006596 A1 Jan. 8, 2004

(51) Int. Cl.
*G06F 3/00* (2006.01)
*G06F 15/00* (2006.01)
*H04N 1/00* (2006.01)

(52) U.S. Cl. .......................... 710/15; 710/62; 715/500; 358/400

(58) Field of Classification Search .................... 710/1, 710/2, 5, 6, 7, 8, 15, 62; 715/500, 908; 358/400
See application file for complete search history.

(56) References Cited

U.S. PATENT DOCUMENTS

| 5,442,546 | A | 8/1995 | Kaji et al. |
| 2001/0029521 | A1* | 10/2001 | Matsuda et al. ............ 709/201 |
| 2002/0026591 | A1* | 2/2002 | Hartley et al. .............. 713/201 |
| 2002/0051208 | A1* | 5/2002 | Venable ..................... 358/1.18 |
| 2002/0114021 | A1* | 8/2002 | Lavender et al. ........... 358/474 |

FOREIGN PATENT DOCUMENTS

JP 5-151260 A 6/1993

* cited by examiner

Primary Examiner—Kim Huynh
Assistant Examiner—Alan S. Chen
(74) Attorney, Agent, or Firm—Foley & Lardner LLP (57) ABSTRACT

The present invention includes a reception section which receives a change occurring in an event generated by an information terminal, and an automatic creation section which automatically creates a template in accordance with a change in the event received by the reception section.

12 Claims, 11 Drawing Sheets

Template Auto Creation Settings

Use Name : AAAAAAAAAAAAAAA
Password : ******************

Template Automatic Creation :
- ■ Mail   ● Transmission   ○ Reception
- ☐ Schedule   ○ Creation   ○ Deletion
- ☐ Action Item   ○ Creation   ○ Deletion
- ☐ Print Direction   ○ Print Direction Template Automatic Creation/Deletion Notification :
- ● In Creation   ○ In Deletion E-mail Address :
- ● Default Settings
- ○ ____________

[OK] [Cancel]

Template Auto Delete Settings

Use Name : AAAAAAAAAAAAAA
　　Password : *******************

● Automatic deletion when template is used for [ 1 ] time

○ Automatic deletion when template is not used for fixed time
　　Time : [ 6 ] hours [ 30 ] minuets ○ Automatic deletion when scan OCR result is as follows
　　When characters [ secret from outsiders ] are included ○ Automatic deletion when number of templates is [ 7 ] or above

[ OK ] [ Cancel ]

FIG. 13

Scan Template Backup File

File Name　　: TMP20010724.XML
　　File Size　　: 12KBytes
　　Data Saved　　: 2001/07/24 24:00:00
　　Backup File Format version : version 1.2
　　Device Name : GL00D0C91112921

[ Create New File ] [ Cancel ]

FIG. 14

Scan Template Restore File

File Name : TMP20010724.XML  [Browse...]  [Upload]

- - - - - - - - - - - - - - - - - - - - - - - - - - - - - - - - - - - - -

[Restore]

FIG. 15

Scan Template Backup File

File Name    : TMP20010724.XML
    File Size     : 12KBytes
    Data Saved  : 2001/07/24 24:00:00
    Backup File Format version : version 1.2
    Device Name : GL00D0C91112921

[Continue]  [Cancel]

FIG. 16

Scan Template Journal

| Group No. | Group Name | Template No. | Template Name | Status | Date |
|---|---|---|---|---|---|
| 001 | ABC | 1 | Scan to TWAIN | Deleted | 2001/07/24 12:00 |
| 001 | ABC | 1 | Scan to TWAIN | Created | 2001/07/24 11:00 |
| 002 | ABC | 6 | Scan to File | Created | 2001/07/24 11:05 |

FIG. 17

PERIPHERAL EQUIPMENT OF COMPUTER

BACKGROUND OF THE INVENTION

1. Field of the Invention

The present invention relates to peripheral equipment of a computer which performs automatic generation or automatic deletion of a template.

2. Description of the Related Art

As peripheral equipment of a computer, there has heretofore been a composite apparatus including many types of functions such as a copying function, a facsimile function, a print function and others. This composite apparatus includes a job template called a "template" as a job using, e.g., a scanner. This job template includes two settings, i.e., a scan setting and an agent setting.

The scan setting consists of a setting of a resolution for scanning, a setting of both sides or a single side, a setting of presence/absence of rotation, a setting of a paper size, a setting of a scan mode and others. The agent setting consists of settings of TWAIN, File Share, Email, iFax and others.

Before using the template, a user must set the template from the Web in advance.

Conventionally, a user must manually create the job template before use. Further, he/she must manually delete the job template.

It is an object of the present invention to automatically create or delete the template.

BRIEF SUMMARY OF THE INVENTION

The present invention includes a reception section which receives a change occurring in an event generated by an information terminal, and an automatic generation section which automatically generates a template in accordance with the change in the event received by the reception section.

The present invention includes a reception section which receives a change occurring in an event generated by an information terminal and an automatic deletion section which automatically deletes a template in accordance with the change in the event received by the reception section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

An embodiment according to the present invention will now be described hereinafter with reference to the accompanying drawings.

Figure 1:
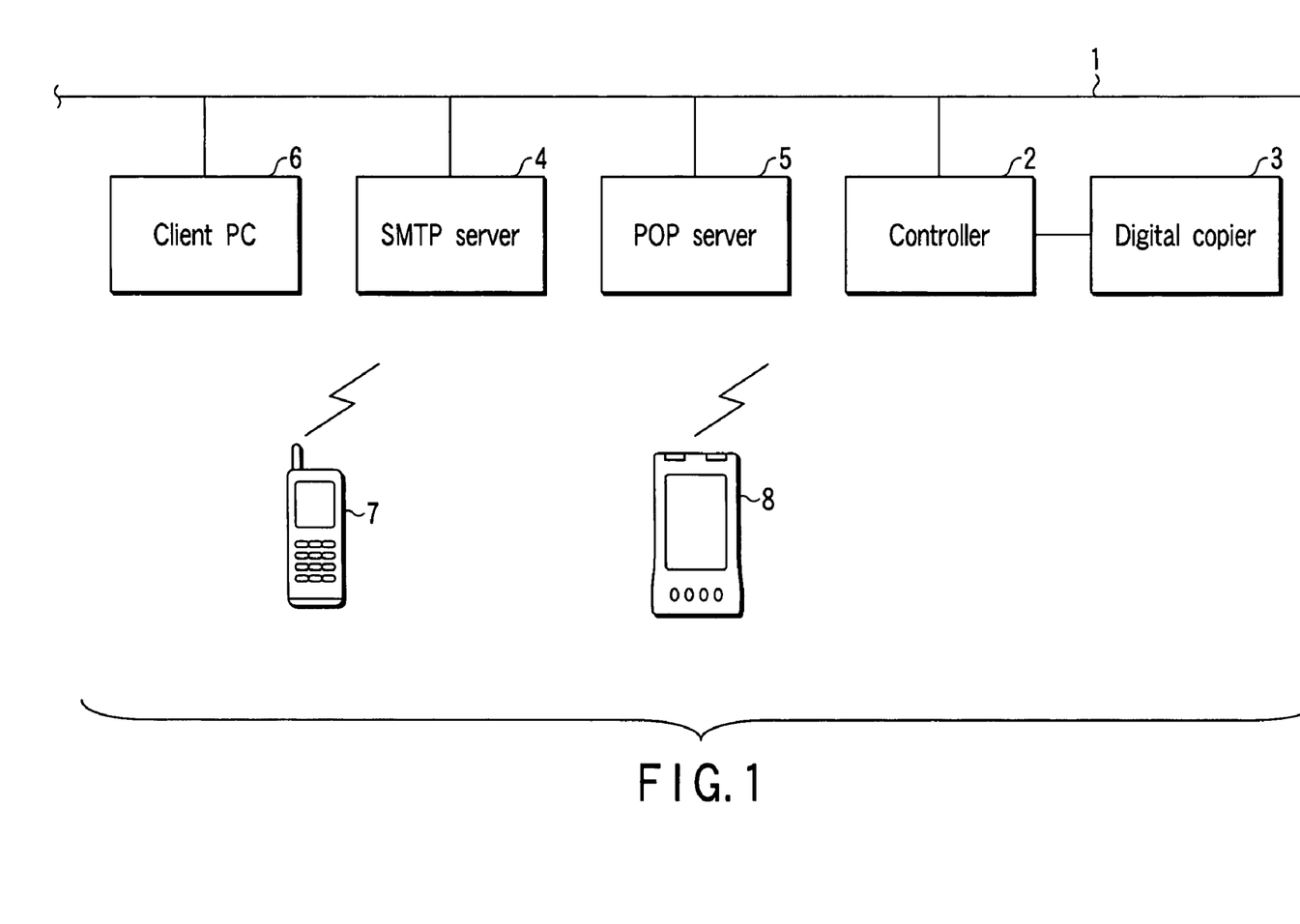
FIG. 1 is a block diagram showing a system structure according to an embodiment of the present invention.

FIG. 1 is a block diagram showing a system structure. In this system, a LAN (Local Area Network) 1 and a controller 2 are arranged. The controller 2 is electrically connected to the LAN 1. The controller 2 is electrically connected to a digital copier 3. The controller 2 and the digital copier 3 constitute peripheral equipments of a computer.

Furthermore, in this system, a SMTP (simple mail transfer protocol) server 4 and a POP (point of presence) server 5. The SMTP server 4 and the POP server 5 are electrically connected to the LAN 1. Moreover, in this system, a client PC (personal computer) 6 is arranged. The client PC 6 is electrically connected to the LAN 1.

In addition, this system uses a PHS (personal handyphone system) 7 or a PDA (personal digital assistant) 8 which are portable terminals. The PHS 7 and the PDA 8 can be directly connected to the controller 2 by using a wireless LAN or Bluetooth.

The client PC 6, the PHS 7 and the PDA 8 constitute information terminals 10.

Figure 2:
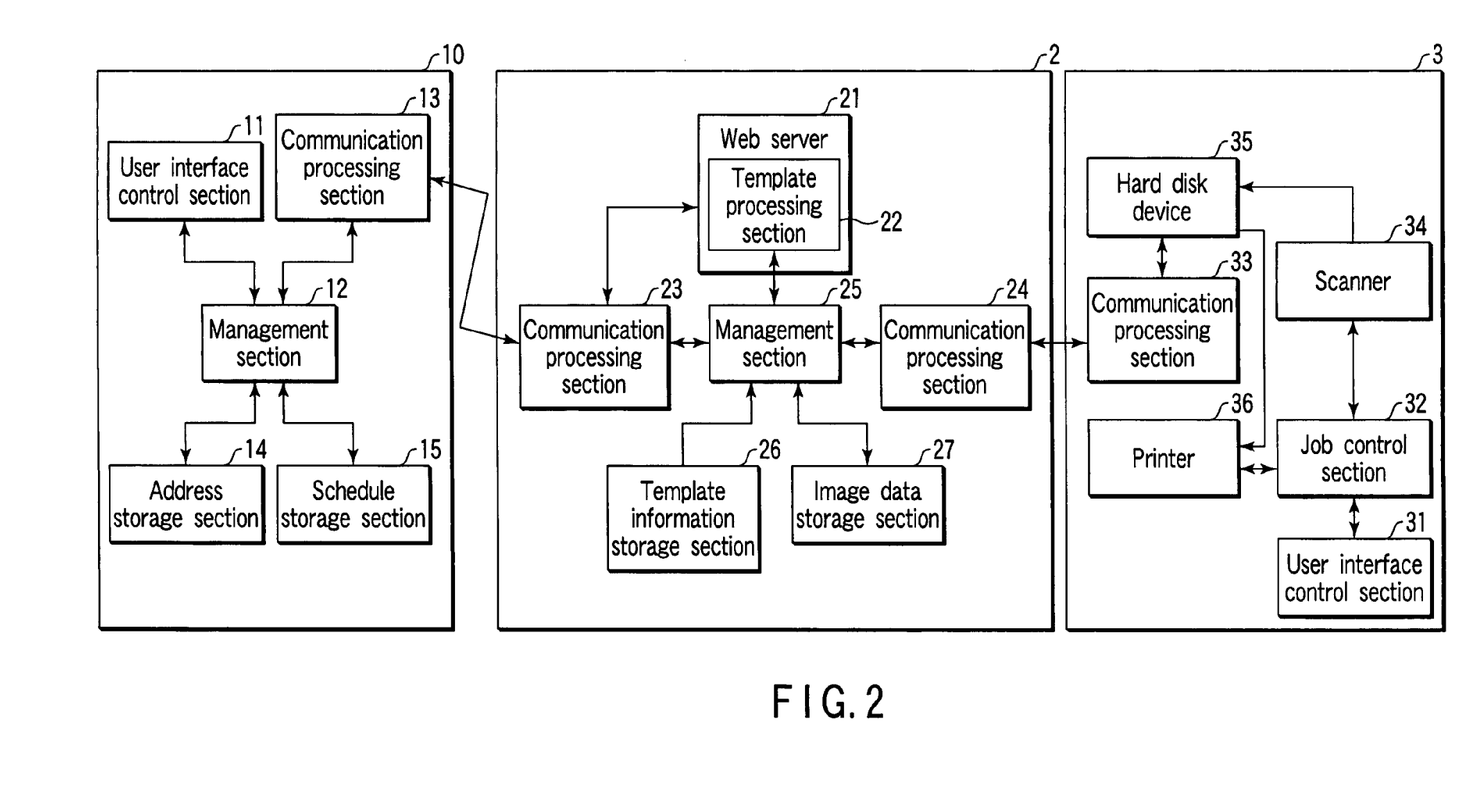
FIG. 2 is a block diagram showing structures of an information terminal, a controller and a digital copier in the embodiment.

The information terminal 10, the controller 2 and the digital copier 3 respectively have the structures shown in FIG. 2.

The information terminal 10 includes a user interface control section 11, a management section 12, a communication processing section 13, an address storage section 14 and a schedule storage section 15. They are constituted by a CPU, a ROM, a RAM, an I/O or the like.

The user interface control section 11 is a module which manages the user interface. The management section 12 is a module which manages an address book stored in the address stored section 14 or a schedule stored in the schedule storage section 15 and controls the information terminal. The communication processing section 13 is a module which controls the communication of the LAN 1, the wireless LAN, Bluetooth or the like.

The controller 2 includes a Web server 21, a template processing section 22 provided in the Web server 21, communication processing sections 23 and 24, a management section 25, a template information storage section 26, and an image data storage section 27.

The Web server 21 is a Web server as typified by IIS, and uses www server software manufactured by Microsoft or Apache which is free.

The communication processing section 23 is a module which controls the communication of the LAN 1, the wireless LAN, the Bluetooth or the like. The communication processing section 24 is a module which processes the communication with the digital copier 3.

The management section 25 is a management module which controls the controller 2. The template information storage section 26 is a data base which stores scan template information. The image data storage section 27 is a data base which stores image data transferred from the digital copier 3. This image data is image data scanned and read by the digital copier 3.

The digital copier 3 includes a user interface control section 31, a job control section 32, a communication processing section 33, a scanner 34, a hard disk device 35, and a printer 36.

The user interface control section 31 is a module which controls a control panel and provides the user interface. The job control section 32 is a module which controls respective jobs of scan, print and copy.

The communication processing section 33 is a module which processes the communication with the controller 2. The scanner 34 is a module which scans a document and reads an image. The printer 36 is a module which prints print data, such as image data, onto paper. The hard disk device 35 stores image data read by the scanner 34 or print data to be printed by the printer 36.

The controller 2 also performs processing to automatically create a scan job template when executing a scan job, using the scan function of the digital copier 3. That is, the controller 2 automatically creates a scan job template by using an event created in the information terminal 10 (the client PC6, the PHS 7, the PDA 8) as a trigger. As the event created in the information terminal 10, there are transmission of an email, change in schedule, change in Action Item, direction of printing or the like, for example.

Figure 3:
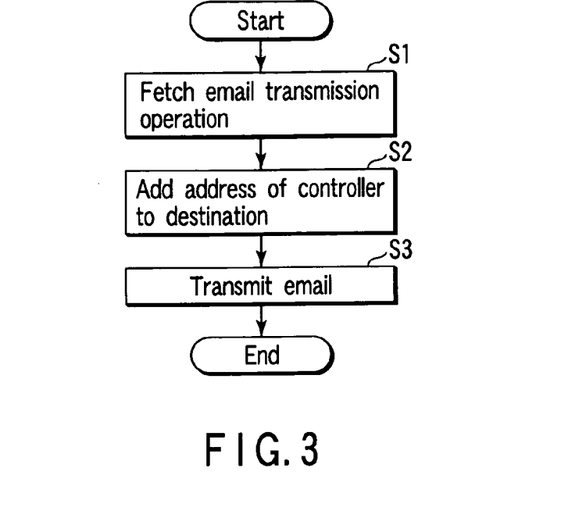
FIG. 3 is a flowchart showing processing in an email transmission operation by the information terminal in the embodiment.

At first, giving description on transmission of an email, a user creates an email on the information terminal 10, determines a destination, and directs transmission of the email. As a result, the information terminal 10 carries out the processing shown in FIG. 3. That is, at S1, the user interface control section 11 receives the direction of email transmission and informs the management section 12. Then, at S2, the management section 12 adds an address of the controller 2 to the destination of the email. Subsequently, at S3, the communication processing section 13 transmits the email to the controller 2 and terminates the processing. That is, the email is delivered to the controller 2 from the communication processing section 13 through the SMTP server 4 and the POP server 5.

Figure 4:
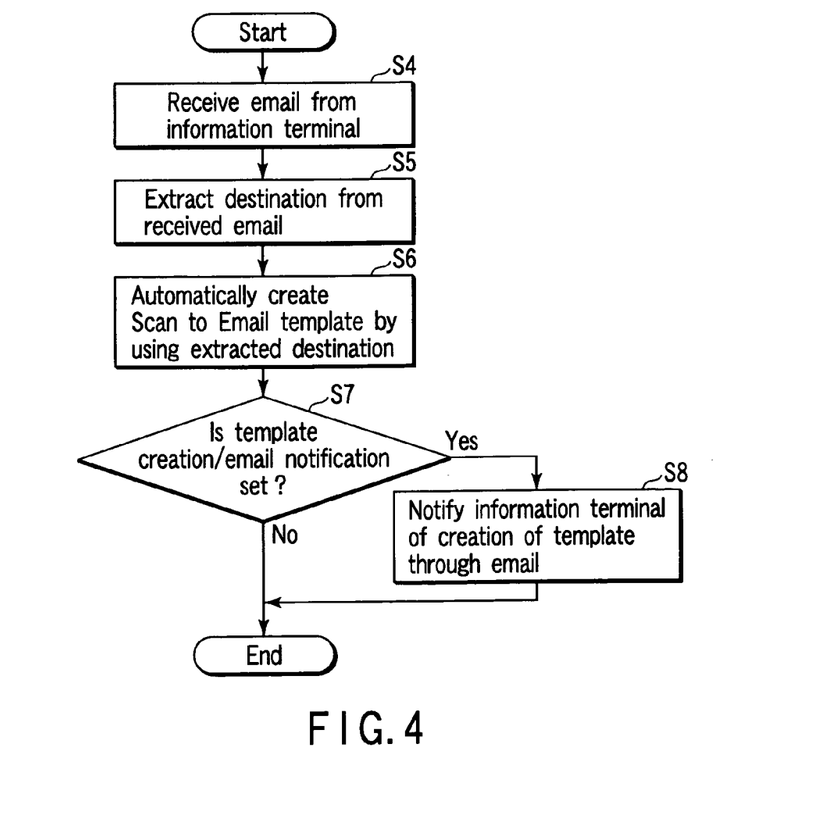
FIG. 4 is a flowchart showing automatic generation processing of a Scan to Email template by the controller in the embodiment.

On the other hand, the controller 2 executes the processing shown in FIG. 4. That is, at S4, the communication processing section 23 receives the email from the information terminal 10 of the client. Then, at S5, the communication processing section 23 extracts the destination from the received email. Thereafter, at S6, the template processing section 22 uses the extracted destination and automatically creates a Scan to Email template. The management section 25 receives the automatically created Scan to Email template from the template processing section 22 and stores it in the template information storage section 26.

Then, the controller 2 judges whether notification of automatic creation of the template through an email is set by the management section 25 at S7. In addition, if the email notification is set, the controller 2 notifies the information terminal 10 of creation of the template through the email and terminates the processing at S8. Additionally, if the email notification is not set, the controller 2 terminates the processing without performing the email notification.

Subsequently, giving description as to change in the schedule, a user performs a schedule change operation on the information terminal 10. The change operation here means operations of creation, deletion and change.

Figure 5:
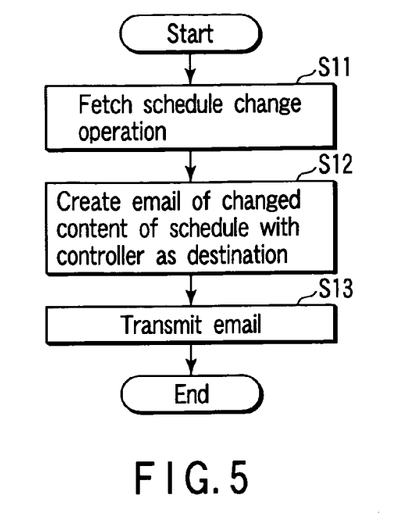
FIG. 5 is a flowchart showing processing in a schedule change operation by the information terminal in the embodiment.

The information terminal 10 executes the processing shown in FIG. 5. That is, at S11, the information terminal 10 receives a direction of the schedule change operation from the user interface control section 11 and notifies the management section 12. Subsequently, at S12, the information terminal 10 extracts a difference of a changed part in the schedule by the management section 12, and creates an email message in order to notify the controller 2 of the difference through the email. A destination of the email is an address of the controller 2. Then, at S13, the information terminal 10 transmits the email to the controller 2 from the communication processing section 13 and terminates the processing. That is, the email is delivered from the communication processing section 13 to the controller 2 through the SMTP server 4 and the POP server 5.

Figure 6:
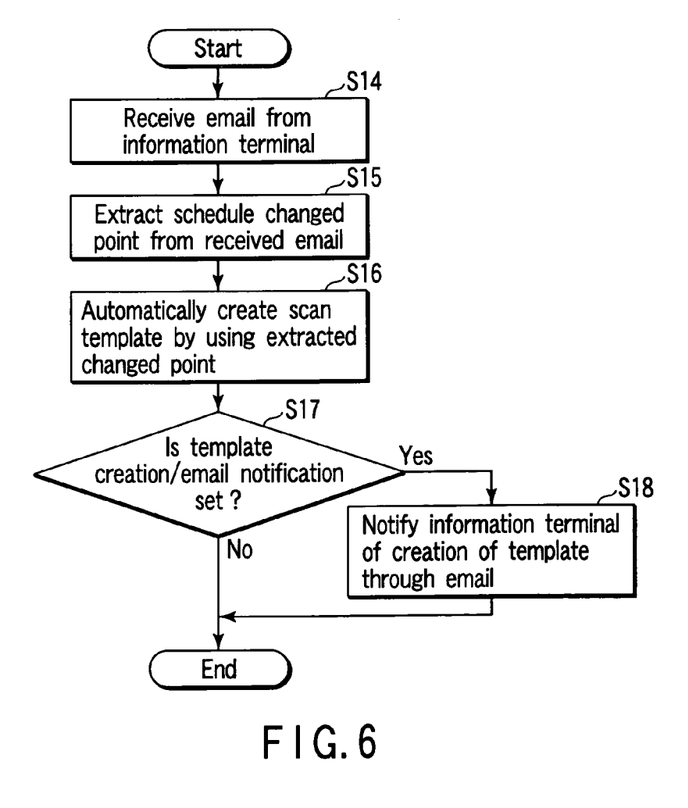
FIG. 6 is a flowchart showing automatic generation processing of a scan template by the controller in the embodiment.

On the contrary, the controller 2 executes the processing shown in FIG. 6. That is, the controller 2 receives the email from the information terminal 10 by the communication processing section 23 at S14. Subsequently, at S15, the controller 2 extracts a changed point in the schedule and a sender from the email received by the communication processing section 23. Then, at S16, the controller 2 automatically creates the scan template by using extracted difference information of the schedule and email sender information in the template processing section 22. The management section 25 receives the automatically created scan template from the template processing section 22 and stores it in the template information storage section 26.

Then, at S17, the controller 2 judges whether notification of automatic generation of the scan template through an email is set by the management section 25. Further, if the email notification is set, the controller 2 notifies the information terminal 10 of creation of the template through an email and terminates the processing at S18. Furthermore, if the email notification is not set, the controller 2 terminates the processing without performing the email notification.

Furthermore, giving description as to a change in Action Item, a user performs an operation to change the Action Item on the information terminal 10. The change operation here means operations of creation, deletion and change.

Figure 7:
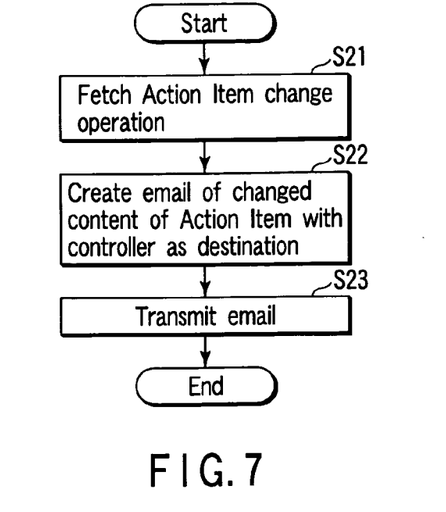
FIG. 7 is a flowchart showing processing in an Action Item change operation by the information terminal in the embodiment.

The information terminal 10 executes the processing shown in FIG. 7. That is, at S21, the information terminal 10 receives a direction of the Action Item change operation from the user interface control section 11 and notifies the management section 12. Subsequently, at S22, the information terminal 10 extracts a difference of a changed part in the Action Item by the management section 12, and creates an email message in order to notify the controller 2 of the difference through the email. A destination of the email is an address of the controller 2. Then, at S23, the information terminal 10 transmits the email to the controller 2 by the communication processing section 13 and terminates the processing. That is, the email is delivered to the controller 2 from the communication processing section 13 through the SMTP server 4 and the POP server 5.

Figure 8:
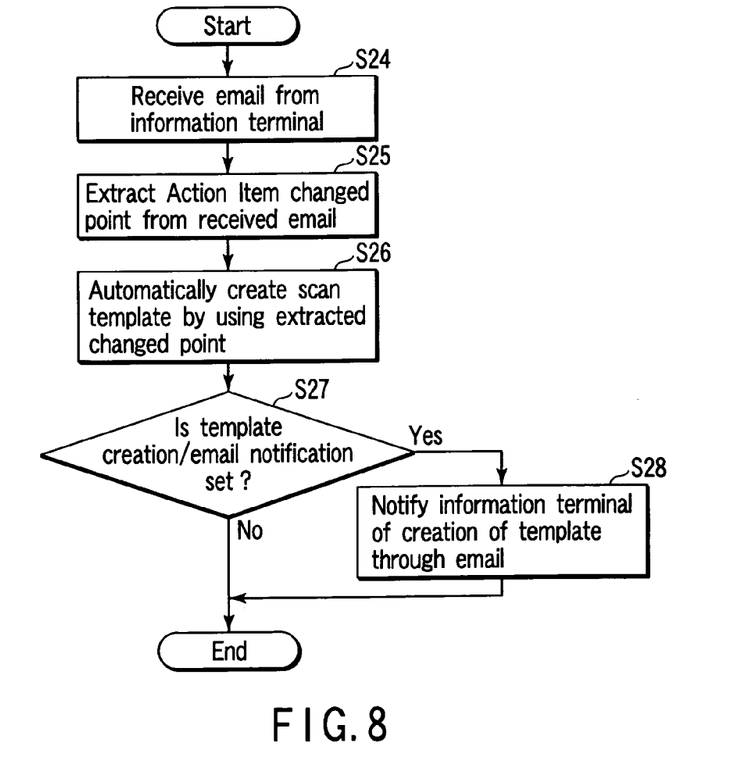
FIG. 8 is a flowchart showing automatic generation processing of a scan template by the controller in the embodiment.

On the other hand, the controller 2 executes the processing shown in FIG. 8. That is, at S24, the controller 2 receives the email from the information terminal 10 by the communication processing section 23. Subsequently, at S25, the controller 2 extracts a changed point in the Action Item and a sender from the received email by the communication processing section 23.

Then, at S26, the controller 2 automatically creates the scan template by using the extracted difference information of the Action Item and the email sender information by the template processing section 22. The management section 25 receives the automatically created scan template from the template processing section 22 and stores it in the template information storage section 26.

Subsequently, at S27, the controller 2 judges whether notification of automatic creation of the scan template through an email is set by the management section 25. Furthermore, if the email notification is set, the controller 2 notifies the information terminal 10 of creation of the template through the email and terminates the processing at S28. Moreover, if the email notification is not set, the controller 2 terminates the processing without performing the email notification.

Now, giving description as to direction of printing, a user performs an operation to change a print direction on the information terminal 10. The change operation here means operations of creation, deletion and change.

Figure 9:
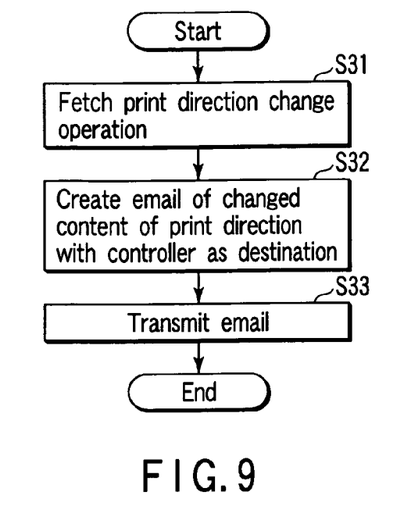
FIG. 9 is a flowchart showing processing in a print direction change operation by the information terminal in the embodiment.

The information terminal 10 executes the processing shown in FIG. 9. That is, at S31, the information terminal 10 receives the print direction change operation by the user interface control section 11 and informs the management section 12.

Subsequently, at S32, the information terminal 10 extracts a difference of a changed part in the print direction by the management section 12, and creates an email message in order to inform the difference to the controller 2 through the email. A destination of the email is an address of the controller 2.

Then, at S33, the information terminal 10 transmits the email to the controller 2 by using the communication processing section 13 and terminates the processing. That is, the email is delivered to the controller 2 from the communication processing section 13 through the SMTP server 4 and the POP server 5.

Figure 10:
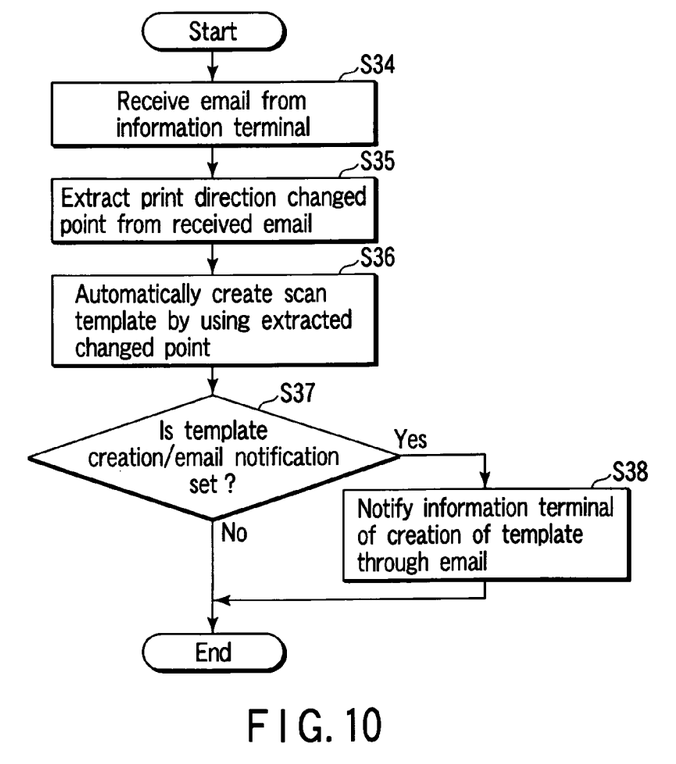
FIG. 10 is a flowchart showing automatic generation processing of the scan template by the controller in the embodiment.

On the other hand, the controller 2 executes the processing shown in FIG. 10. That is, at S34, the controller 2 receives the email from the information terminal 10 by the communication processing section 23. Subsequently, at S35, the controller 2 extracts a changed point in the print direction and a sender from the received email by the communication processing section 23.

Then, at S36, the controller 2 automatically creates the scan template by using the extracted difference information of the print direction and the email sender information in the template processing section 22. The management section 25 receives the automatically created scan template from the template processing section 22 and stores it in the template information storage section 26.

Then, at S37, the controller 2 judges whether notification of automatic creation of the scan template through an email when the scan template automatically created is set. Then, if the email notification is set, the controller 2 notifies the information terminal 10 of creation of the template through the email and terminates the processing at S38. Further, if the email notification is not set, the controller 2 terminates the processing without performing the email notification.

Figure 11:
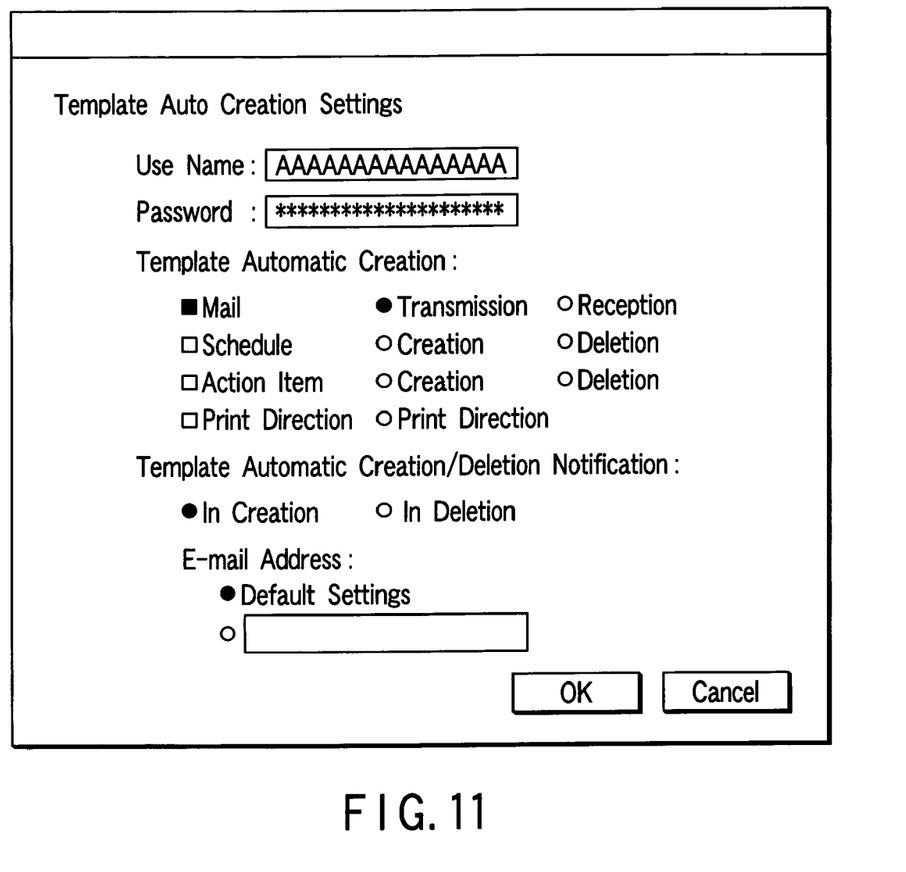
FIG. 11 is a view showing a template automatic generation setting screen of the information terminal in the embodiment.

FIG. 11 shows a template automatic creation set screen. This screen is a user internet image on the Web. When the user specifies the URL of the "template automatic creation set screen" of the controller 2 on the information terminal 10, the information terminal 10 displays this screen.

In this screen, it is possible to perform settings concerning the User Name, the Password and the template automatic creation. Furthermore, as the settings concerning the template automatic creation, there are settings of transmission/reception of email, creation and deletion of the schedule, creation and deletion of the Action Item, and the print direction.

Moreover, in this screen, when the template is automatically created, it is possible to enable or disable notification of automatic creation of the template to the information terminal 10 through an email when the template is automatically created. That is, it is performed by setting the "Template Automatic Creation/Deletion Notification".

Figure 12:
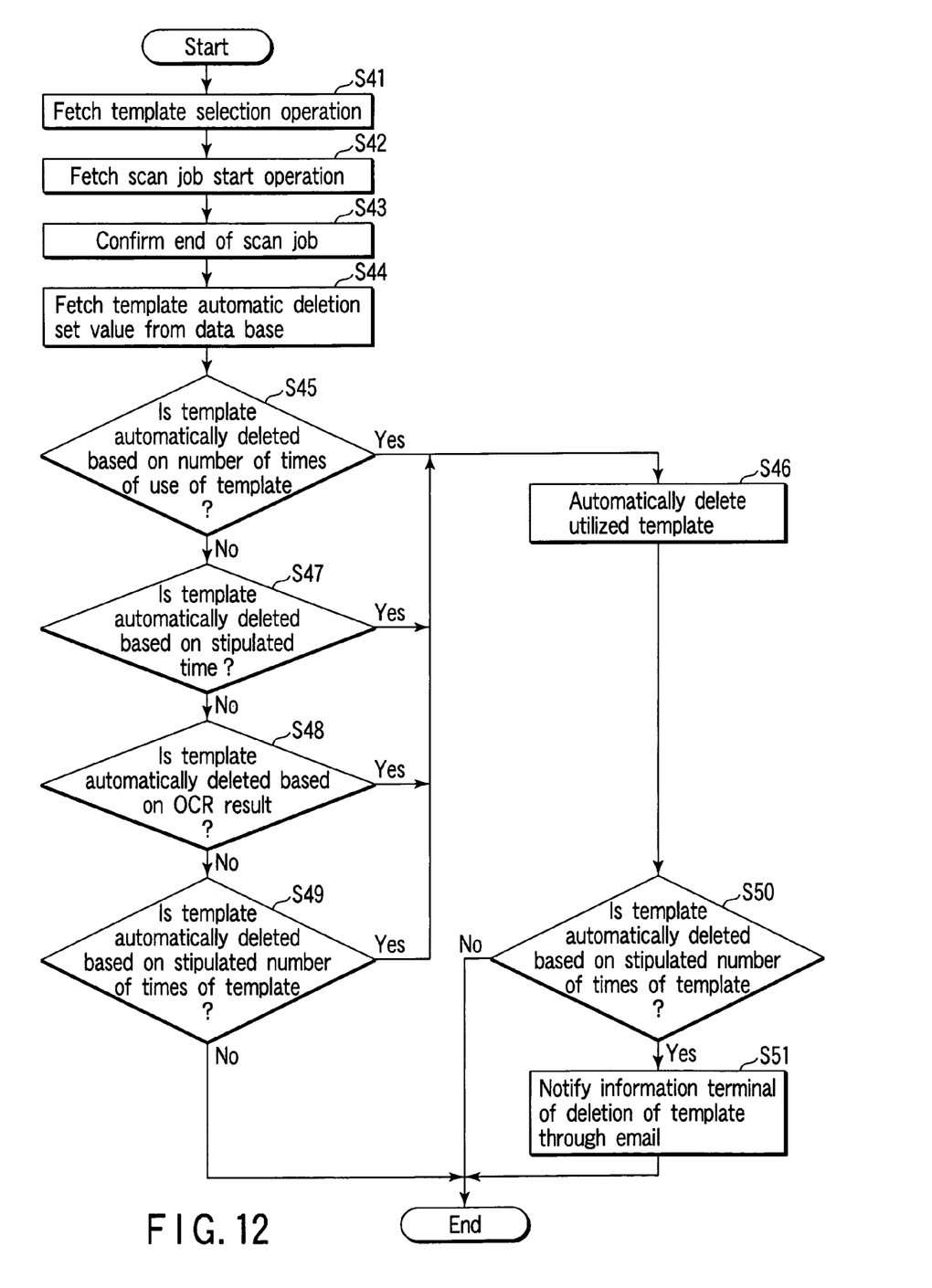
FIG. 12 is a flowchart showing processing to automatically delete the template by a controller in the embodiment.

FIG. 12 is a flowchart showing processing of the template automatic deletion by the controller 2.

At S41, the controller 2 first fetches the scan template selection operation in order to execute the scan job by the digital copier 3.

The user sets a document to the automatic document feeder of the digital copier 3, and operates a Start key 37*j* in the control panel 37. As a result, the controller 2 fetches the scan job start operation at S42. Consequently, the digital copier 3 feeds the document sheets one by one from the automatic document feeder and reads the document by using the scanner 34.

Upon completing reading of all the document sheets set in the automatic document feeder by the scanner 34, the scan job is terminated, and hence the controller 2 confirms the end of this scan job at S43.

Upon confirming the end of the scan job, the controller 2 acquires a template automatic deletion set value from the template information storage section 26 which is used as a data base at S44.

Subsequently, the controller 2 judges the setting condition of the template automatic deletion. At S45, the controller 2 first judges whether the template automatic deletion is set based on the number of times of use of the template. This sets to automatically delete the template when this template is used for a given number of times.

Moreover, if the automatic deletion of the template is set based on the number of times of use of the template and that number of times of use is reached, the controller 2 automatically deletes the utilized template from the template information storage section 26.

In addition, if the automatic deletion of the template based on the number of times of use of the template is not set, the controller 2 judges whether automatic deletion of the template based on a stipulated time is set at S47. This sets to automatically delete the template when this template is not used for a long time.

Additionally, if the automatic deletion of the template based on a stipulated time is set and the template is not used for the stipulated time or more, the controller 2 automatically deletes the utilized template from the template information storage section 26 at S46.

Further, if the automatic deletion of the template based on the stipulated time is not set, the controller 2 judges whether automatic deletion of the template based on a result of reading by an OCR (optical character reader) is set at S48. This sets to automatically delete the template based on a content of the scan job.

Furthermore, if the automatic deletion of the template based on a result of reading by the OCR is set and the automatic deletion of the template based on a result of reading is judged, the controller 2 automatically deletes the utilized template from the template information storage section 26 at S46. For example, if there are characters "secret from outsiders" in a result of reading by the OCR, the controller 2 automatically deletes this template.

Moreover, if the automatic deletion of the template based on a result of reading by the OCR is not set, the controller 2 judges whether the automatic deletion of the templates when the stipulated number or more of the templates are automatically created is set at S49. This sets restriction in the number of templates to be created so that the number of the templates is not increased.

In addition, if the automatic deletion of the templates when the stipulated number of the templates are automatically created is set and the stipulated number or more of the templates are automatically created, the controller 2 automatically deletes the utilized templates from the template information storage section 26 at S46.

Additionally, if the automatic deletion of the templates when the stipulated number or more of the templates are automatically created is not set, the controller 2 terminates the automatic deletion processing of the templates.

Upon executing the processing to automatically delete the utilized templates from the template information storage section 26 at S46, the controller 2 then judges whether notification of automatic deletion of the templates through an email is set at S50. Further, if the email notification is set, the controller 2 notifies the information terminal 10 of the automatic deletion of the templates through an email at S51. Furthermore, if the email notification is not set, the controller 2 terminates the automatic deletion processing of the template.

Figure 13:
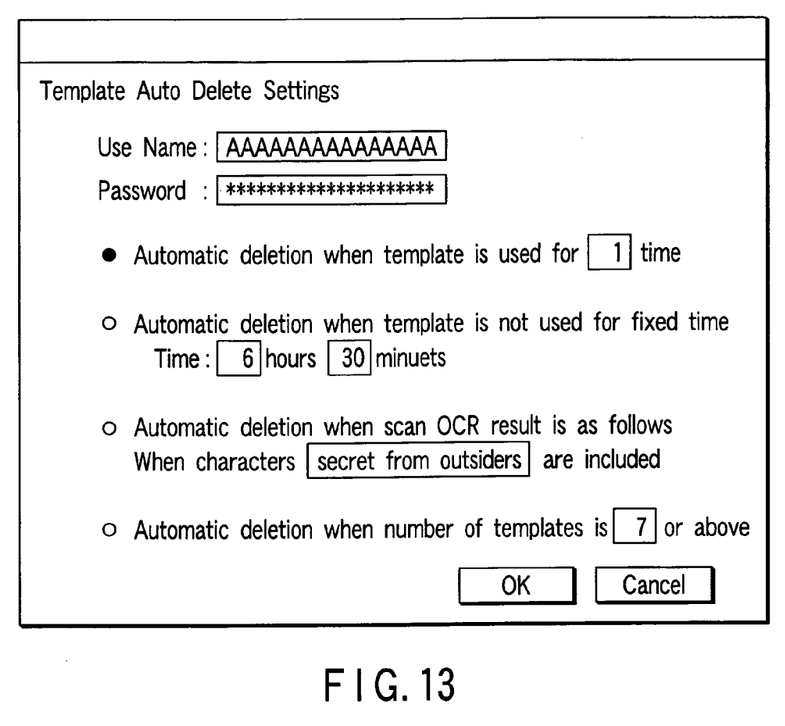
FIG. 13 is a view showing an example of a template automatic deletion setting screen in the information terminal in the embodiment.

FIG. 13 shows an example of the template automatic deletion set screen in the information terminal 10. This screen is the user Internet image of the Web. When the user specifies the URL of the "template automatic deletion set screen" of the controller 2 on the information terminal 10, the information terminal 10 displays this screen.

In this screen, the user can conduct settings concerning a user name, a password and template automatic deletion. The settings concerning the template automatic deletion means a setting of the number of times of use when the template is automatically deleted based on the number of times of use of the template, a setting of a stipulated time when the template is automatically deleted based on the stipulated time, a setting of a scan job content when the template is automatically deleted based on a result of reading by using the OCR, and a setting of the stipulated number if the templates are automatically deleted when the stipulated number of more of the templates are created.

The screen of FIG. 13 shows the state that the template is automatically deleted based on the number of times of use of the template and the number of times of use is set to one.

Figure 14:
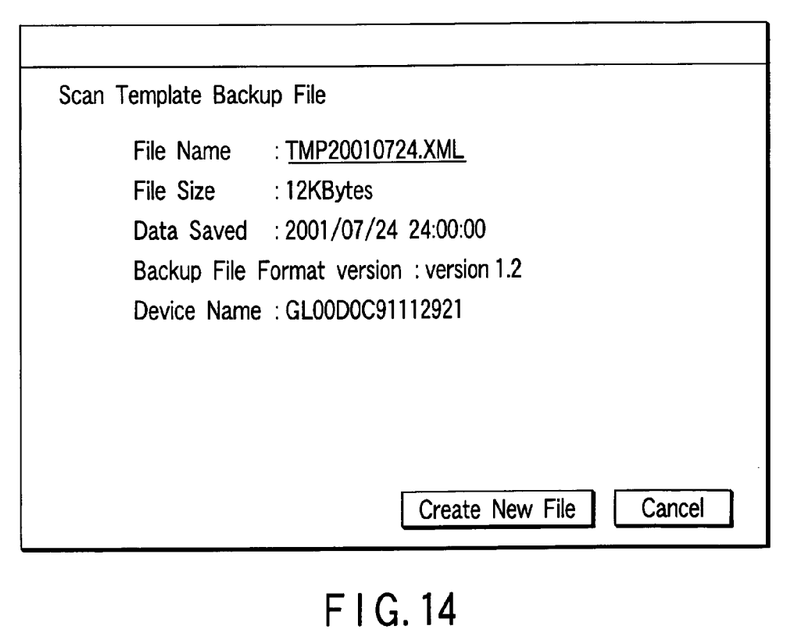
FIG. 14 is a view showing an example of a screen to back up only the template to be automatically generated in the information terminal in the embodiment.

FIG. 14 shows an example of the screen of the information terminal 10 which backs up only the template automatically created. This screen displays File Name, File Size, Data Saved, Backup File Format version, Device Name. The file to be backed up is a file obtained by making the setting of only the automatically created template in the form of XML (extensible markup language). In this screen, when a link of File Name is clicked, backup is started. Moreover, in this screen, when a button Create New File is clicked, a file for backup is created.

Figure 15:
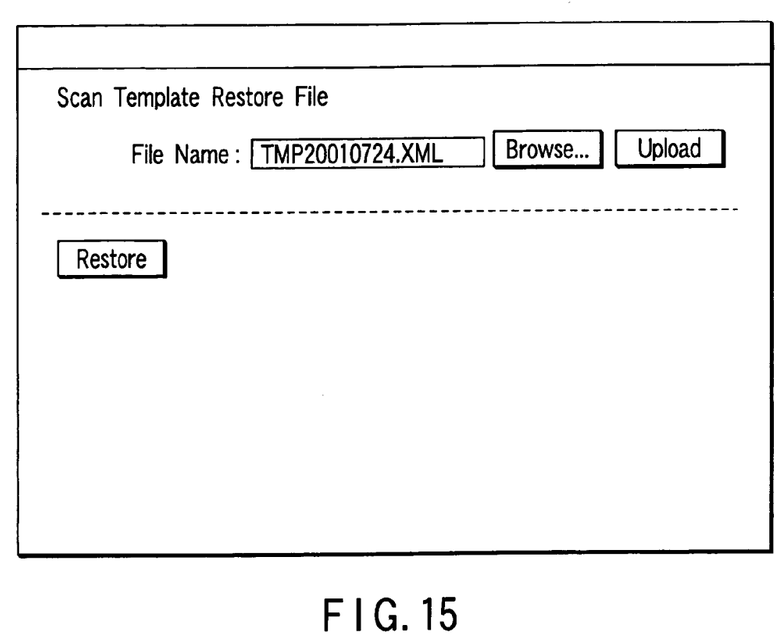
FIG. 15 is a view showing an example of a screen to restore an automatically generated template in the information terminal in the embodiment.
Figure 16:
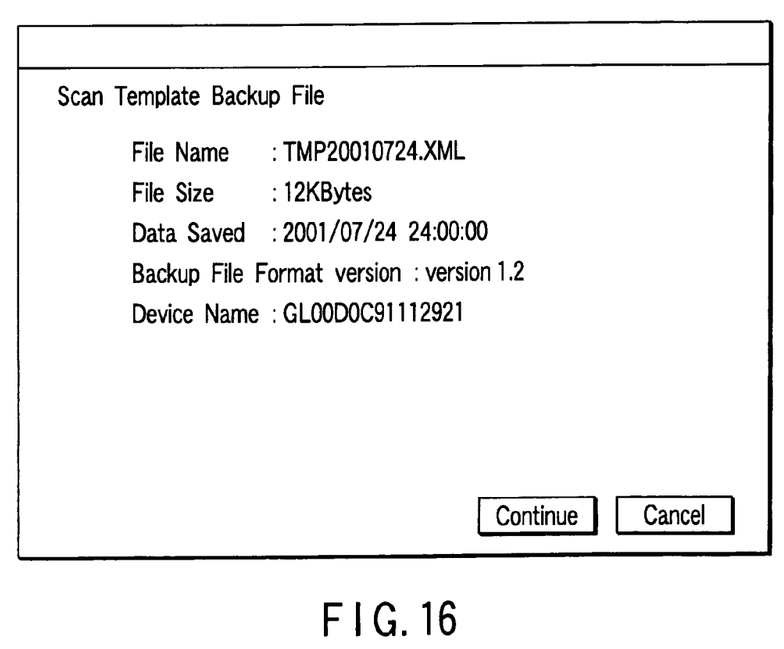
FIG. 16 is a view showing an example of a screen to restore the automatically generated template in the information terminal in the embodiment.

FIGS. 15 and 16 show an example to restore the automatically created template in the information terminal 10. In the screen of FIG. 15, the user first clicks a button Browse . . . , and selects a file to be restored. When the file is selected, a file name is displayed in the part File Name.

Then, the user clicks the button Upload, and starts Upload of the file. At this moment, the content of the file is inspected. Then, when the inspection is normally terminated, a screen such as shown in FIG. 16 is displayed, and an inspection result is displayed.

Subsequently, in the screen of FIG. 16, when the user clicks a button Continue, the processing returns to the screen of FIG. 15. In the screen of FIG. 15, the user clicks the button Restore, and starts the Restore processing.

Figure 17:
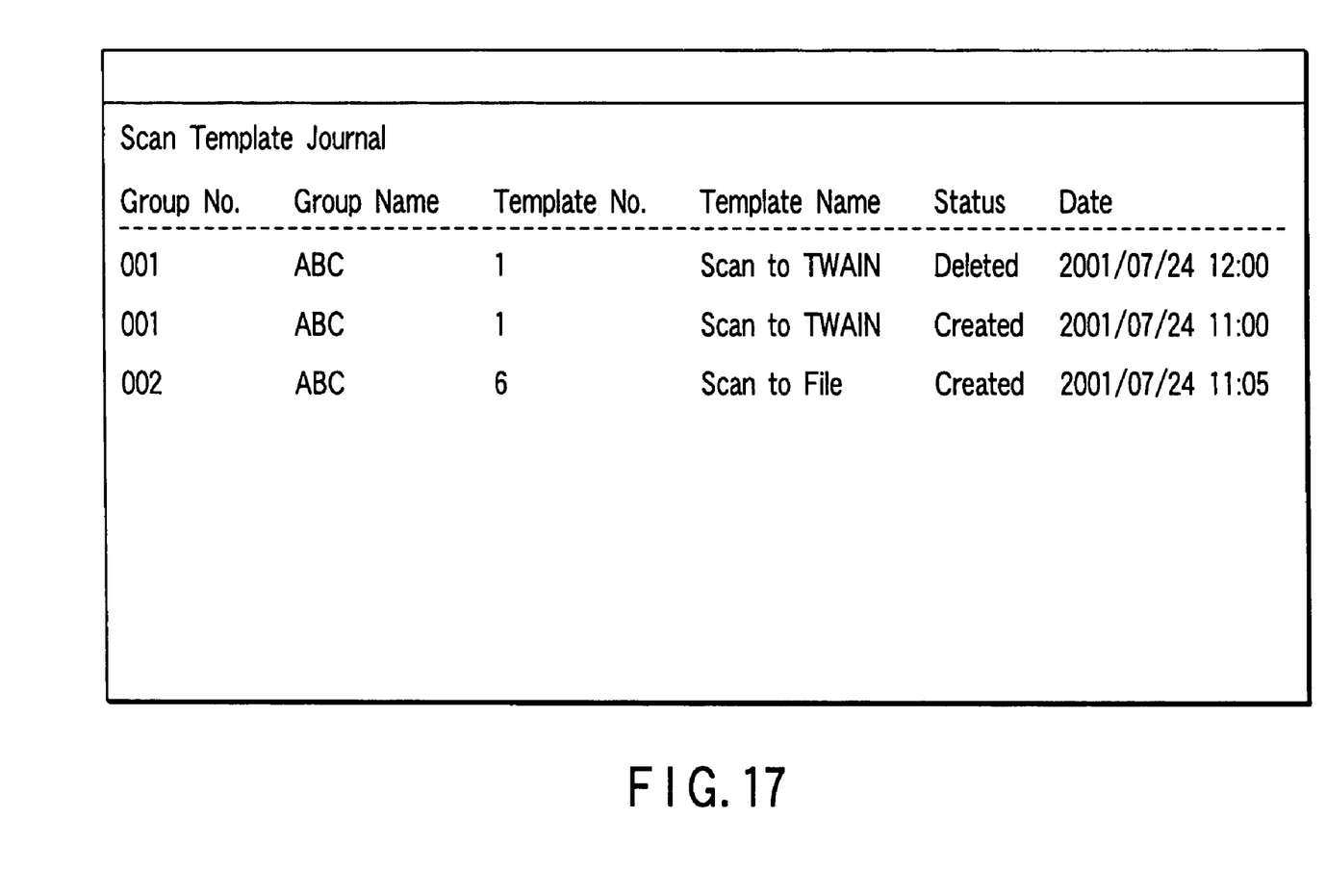
FIG. 17 is a view showing an example of a screen to display a history of automatic generation/deletion of the template in the information terminal in the embodiment.

FIG. 17 shows an example of the screen to display a history of template automatic creation/deletion in the information terminal 10. This screen displays Group No., Group Name, Template No., Template Name, Status, and Date. In the part Status, "Created" is displayed when the template is automatically created, and "Deleted" is displayed when it is automatically deleted.

In such a structure, the life cycle of the template, i.e., the automatic creation of the template based on occurrence of an event in the information terminal 10, the use of the template in the digital copier 3 and the automatic deletion of the template can be all managed by the controller 2.

Further, since the job template is automatically created, the user can omit the operation to create the job template. Furthermore, since the job template can be automatically deleted, the number of job templates can be prevented from being increased, and the management cost used to manage the job templates can be reduced. Moreover, the size of the template information storage section 26 can be decreased so as not to increase the number of the job templates, and the high speed of access can be constantly assured.

For example, description will now be given as to a case where a user performs scan distribution of proceedings by using the job template.

When a conference is held, the user must transmit a conferencing communication email. In addition, a person to whom the conferencing communication email is transmitted is the same as a person to whom the proceedings is transmitted. Therefore, the controller 2 automatically creates a proceeding communication template with the conferencing communication email as an event of the information terminal 10. Then, after the end of the conference, the proceedings can be scanned by the digital copier 3, put in the automatically created proceeding communication template and distributed through an email. Then, after notifying the proceedings by using the proceeding notification template, this template can be automatically deleted.

Description will now be given as to a case where a user performs scan transmission of a document at a business trip site.

When the user holds only the PHS 7, he/she can scan and transmit the document by using the digital copier 3 set in a convenience store. That is, the user transmits the scan data as an email from the PHS 7 to a person to whom the scan data should be transmitted in advance.

The controller 2 of the digital copier 3 set in the convenience store automatically creates the template with this email as an event. The user goes to a place where the digital copier 3 is set, scans the document by using the automatically created template and puts it in the template. Then, he/she transmits it through an email. The template is automatically deleted after use.

Description will now be given as to a case where a user performs document printing based on a change in a schedule book.

For example, when the user makes a change in the schedule book on the client PC 6, he/she uses the template used to print the document including items in the schedule. For example, he/she wants to change a date in a top page of the document to be printed in accordance with the schedule, the controller 2 automatically creates a print job template with a change in the schedule book as a trigger. When the user selects the automatically created template on the control panel 37 of the digital copier 3, document printing is executed. The utilized template is automatically deleted when a fixed time has elapsed.

Description will now be given as to a case where a user performs facsimile transmission based on a change in a list "To Do" about items "To Do" which are action items.

When the user makes a change in the list To Do on the client PC 6, for example, when he/she wants to perform facsimile transmission of a document to a necessary member corresponding to a processing item in the list To Do, the controller 2 automatically creates a facsimile job template with a change in the list To Do as a trigger.

When the user selects the automatically created template on the controller panel 37 of the digital copier 3, facsimile transmission is carried out. The utilized template is automatically deleted when it is used for the stipulated number of times or more, for example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A peripheral equipment of a computer, comprising:
   a scanner which scans an image on a document to create electronic data;
   a communication section which performs communication with an information terminal which generates an event;
   a recognition section which recognizes a change occurring in the event received by the communication section from the information terminal;
   an automatic creation section which automatically creates a scan template in accordance with the change in the event recognized by the recognition section;
   a notification section which notifies the information terminal of a content of template automatic creation when the automatic creation section automatically creates the scan template; and
   means for performing the event after putting the electronic data created by the scanner in the scan template automatically created by the automatic creation section.

2. The peripheral equipment of a computer according to claim 1, wherein the change occurring in the event generated by the information terminal recognized by the recognition section is transmission/reception of an email, and
   the automatic creation section automatically creates the scan template at the time of transmission or reception of the email.

3. The peripheral equipment of a computer according to claim 1, wherein the change occurring in the event generated by the information terminal recognized by the recognition section is creation or deletion of a schedule, and
   the automatic creation section automatically creates the scan template at the time of creation or deletion of the schedule.

4. The peripheral equipment of a computer according to claim 1, wherein the change occurring in the event generated by the information terminal recognized by the recognition section is a change in an action item, and
   the automatic creation section automatically creates the scan template in accordance with a the change in the action item.

5. The peripheral equipment of a computer according to claim 1, wherein the change occurring in the event generated by the information terminal recognized by the recognition section is a print direction, and
   the automatic creation section automatically creates the scan template at the time of receiving the print direction.

6. The peripheral equipment of a computer according to claim 1, wherein the notification section notifies all the information terminals concerning creation of the scan template through an email.

7. The peripheral equipment of a computer according to claim 1, further comprising:
   a storage section whieh stores the scan template automatically created by the automatic creation section; and
   an automatic deletion section which automatically deletes a template stored in the storage section in accordance with the change in the event recognized by the recognition section.

8. The peripheral equipment of a computer according to claim 7, wherein the automatic deletion section automatically deletes the scan template automatically created by the automatic creation section when the scan template has not been used for a fixed time or more.

9. The peripheral equipment of a computer according to claim 7, wherein the automatic deletion section automatically deletes the scan template when the automatic creation section automatically creates a stipulated number or more of the scan templates.

10. The peripheral equipment of a computer according to claim 7, further comprising a notification section which notifies the information terminal of a content of job template automatic deletion when the automatic deletion section automatically deletes a job template.

11. The peripheral equipment of a computer according to claim 7, wherein the automatic deletion section automatically deletes the scan template automatically created after the event has been performed by the performing means.

12. The peripheral equipment of a computer according to claim 1, further comprising:
   an automatic deletion section which automatically deletes the scan template after the event has been performed by the performing means.

* * * * *